(12) United States Patent
Solcz

(10) Patent No.: US 8,044,817 B2
(45) Date of Patent: Oct. 25, 2011

(54) PORTABLE ELECTRONIC DEVICE DISTRESS DETECTION SYSTEM

(75) Inventor: Edward J. Solcz, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 407 days.

(21) Appl. No.: 12/270,248

(22) Filed: Nov. 13, 2008

(65) Prior Publication Data

US 2010/0117846 A1 May 13, 2010

(51) Int. Cl.
*G08B 13/00* (2006.01)

(52) U.S. Cl. .................. 340/665; 340/691.6; 340/825.23

(58) Field of Classification Search .................. 340/665, 340/666, 679–680, 662–663, 683, 691.6, 340/693.7, 825.23
See application file for complete search history.

(56) References Cited

U.S. PATENT DOCUMENTS

| | | | | |
|---|---|---|---|---|
| 4,177,868 A | * | 12/1979 | Sanders et al. ................. | 177/211 |
| 4,800,973 A | * | 1/1989 | Angel ........................... | 177/211 |
| 4,995,404 A | * | 2/1991 | Nemir ........................... | 600/590 |
| 5,696,329 A | * | 12/1997 | Silverio de Magalhaes Machado et al. ........ | 73/862.541 |
| 5,886,302 A | * | 3/1999 | Germanton et al. ........... | 177/199 |
| 2009/0014659 A1 | * | 1/2009 | Hennessy et al. ........ | 250/370.09 |

OTHER PUBLICATIONS

Article Re: "Introduction to Strain Gages", Introduction-Voltage Divider Circuit—Bridge Circuit, pp. 1-9, www.facstaff.bucknell.edu/mastascu/eLessonsHtml/Sensors/Strain_Gage.htm.

* cited by examiner

*Primary Examiner* — Daniel Previl
(74) *Attorney, Agent, or Firm* — Alix, Yale & Ristas, LLP

(57) ABSTRACT

A portable electronics distress detection system includes at least one strain gage and an alarm circuit. The strain gage is mountable to an element of the portable electronic device. The alarm circuit includes a Wheatstone bridge associated with each strain gage, with each strain gage providing a resistance input to an arm of the associated Wheatstone bridge. When a mechanical stress is imposed on the portable electronic device, the strain gage changes the resistance input to the arm of the associated Wheatstone bridge, producing a nonzero voltage output from the Wheatstone bridge. The alarm circuit activates the portable electronic device user interface if the Wheatstone bridge voltage output exceeds a predetermined set point.

18 Claims, 3 Drawing Sheets

PORTABLE ELECTRONIC DEVICE DISTRESS DETECTION SYSTEM

BACKGROUND

This disclosure relates to portable electronic devices, such as MP3 players, cell phones, PDA's, digital cameras, etc.

Many people carry one or more portable electronic device whenever they leave their house or workplace. Portable electronic devices are designed to be small and lightweight to facilitate storage on or about a person, and are therefore constructed with thin metal and/or plastic housings. When not in use, the portable electronic devices are often stored in a pocketbook, backpack, briefcase, etc., subjecting the devices to damage due to external stresses induced on the housing by other stored objects. Portable electronic devices may also be overflexed during use, thereby causing damage.

SUMMARY

There is provided a portable electronics distress detection system to detect an external load imposed on a portable electronic device and provide a warning of impending mechanical failure due to the external load. The system comprises at least one strain gage and an alarm circuit. The strain gage is adapted to be mounted to an element of the portable electronic device. The alarm circuit is adapted to control the portable electronic device user interface. The alarm circuit includes a Wheatstone bridge associated with each strain gage, with each strain gage providing a resistance input to an arm of the associated Wheatstone bridge. When a mechanical stress is imposed on the portable electronic device, the strain gage changes the resistance input to the arm of the associated Wheatstone bridge, producing a nonzero voltage output from the Wheatstone bridge. The alarm circuit activates the portable electronic device user interface if the Wheatstone bridge voltage output exceeds a predetermined set point.

The portable electronic device has a housing, and the strain gage is adapted to be mounted to an inner surface of the portable electronic device housing.

At least one strain gage may extend longitudinally on the inner surface of the portable electronic device housing and at least one strain gage may extend laterally on the inner surface of the portable electronic device housing.

A least one strain gage may extend from an upper corner of the portable electronic device housing to a lower corner of the portable electronic device housing.

At least one strain gage may be mounted to an internal element of the portable electronic device.

The alarm circuit may include an "exclusive or" logic.

The portable electronics distress detection system may further comprise a multiplexed input arrangement allowing the strain gages to use a common Wheatstone bridge and the alarm circuit.

There is also provided a portable electronic device comprising multiple elements including a housing, electronics disposed within the interior of the housing, and a user interface in electrical communication with the electronics. A distress detection system is included to detect an external load imposed on the housing. The distress detection system includes at least one strain gage mounted to an element of the portable electronic device. An alarm circuit in electrical communication with the user interface includes a Wheatstone bridge associated with each strain gage, with each strain gage providing a resistance input to an arm of the associated Wheatstone bridge. A mechanical stress imposed on the strain gage through the portable electronic device changes the resistance input to the arm of the associated Wheatstone bridge, producing a nonzero voltage output from the Wheatstone bridge. The alarm circuit activates the user interface if the Wheatstone bridge voltage output exceeds a predetermined set point to provide a warning of impending mechanical failure due to the external load.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
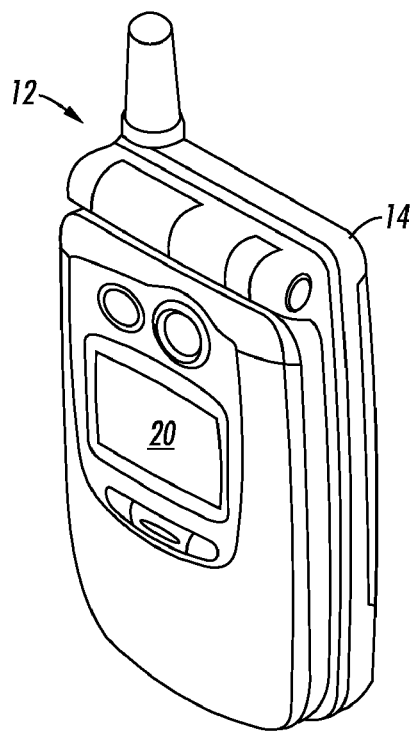
FIG. 1 is a perspective view of a cellular phone having a distress detection system in accordance with the disclosure.
Figure 2:
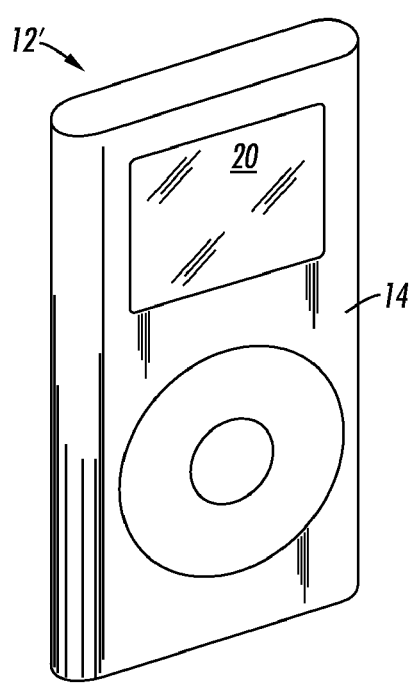
FIG. 2 is a perspective view of a media player having a distress detection system in accordance with the disclosure.
Figure 3:
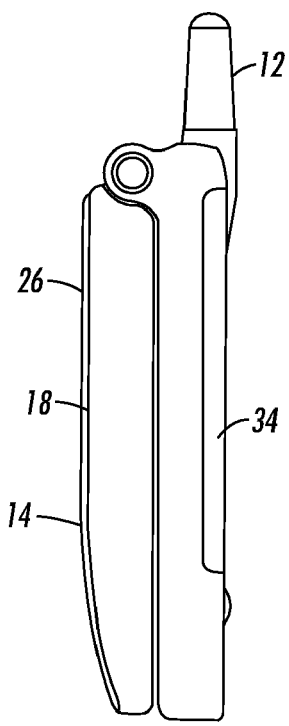
FIG. 3 is a simplified cross-sectional view of the cellular phone of FIG. 1.
Figure 4:
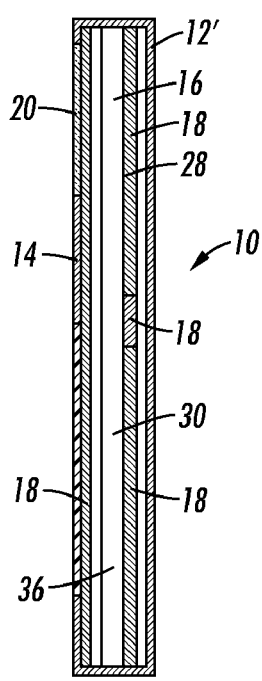
FIG. 4 is a simplified cross-sectional view of the media player of FIG. 2.

With reference to the drawings wherein like numerals represent like parts throughout the several figures, a portable electronics distress detection system in accordance with the present disclosure is generally designated by the numeral 10. The portable electronics distress detection system 10 detects mechanical stress imposed on a portable electronic device 12, 12' and provides a warning to the user of impending mechanical failure due to the external load. More specifically, the portable electronics distress detection system 10 detects deformation in the housing 14 of the portable electronic device 12, 12' and provides a warning to the user when the deformation exceeds a predetermined safety threshold, using the existing human interface related electronics in the portable electronic device 12, 12'.

The system 10 uses one or more strain gages 18 to detect the mechanical stress imposed on the portable electronic device 12, 12'. Strain is the amount of deformation of a body due to an applied force, and can be either positive (tensile) or negative (compressive). Deformation is generally directly proportional to the mechanical stress imposed on the housing 14. Increasing the deformation increases the stress transferred to the device's mechanical systems (e.g., device's housing 14, display area 20, or electronics 16, 30).

Figure 5:
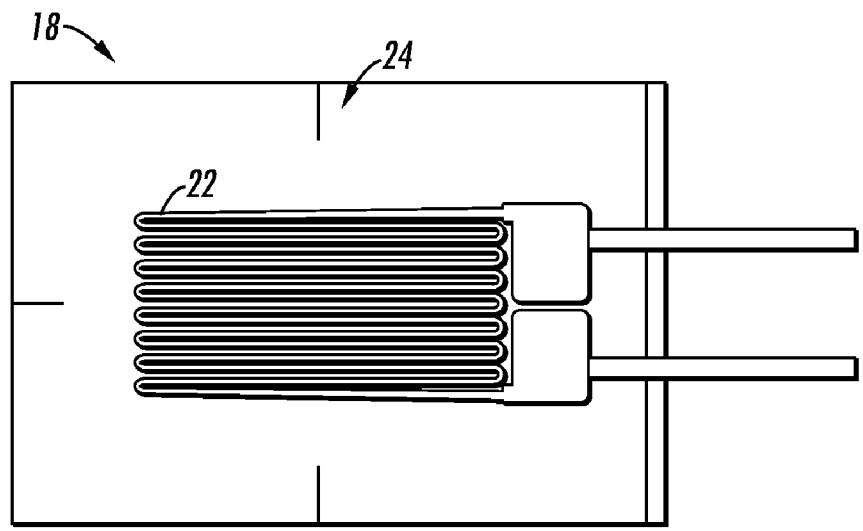
FIG. 5 is a schematic diagram of a strain gage.

With reference to FIG. 5, one type of strain gage 18 is a bonded metallic strain gage. Mechanical stress experienced by the strain gage 18 produces a linear change in electrical resistance. The metallic strain gage consists of a very fine wire or, more commonly, metallic foil 22 arranged in a grid pattern. The grid pattern maximizes the amount of metallic wire or foil 22 subject to strain gage in the parallel direction. The grid may be bonded to a carrier 24, which may be attached directly to an element of the portable electronic device 12, 12', or bonded directly to or embedded in an element of the portable electronic device 12, 12'. It should be appreciated that any manner of mounting the strain gage 18 to the portable electronic device 12, 12' may be used, so long as mechanical stress imposed on the portable electronic device 12, 12' is transmitted to the strain gage 18.

Strain gages 18 are available in small sizes, e.g., 0.08" long×0.06" wide. Accordingly, strain gages 18 may be mounted to different parts of the portable electronic device's mechanical systems and in different orientations to detect transverse and longitudinal bending stresses. In one example, one or more strain gages 18 may be mounted to the inner surface(s) 26 of the portable electronic device housing 14 (FIGS. 1-4). In this example, one or more strain gages 18 may extend longitudinally and/or one or more strain gages 18 may extend laterally across inner surface 26. Alternatively, one or more strain gages 18 may extend at an angle from an upper corner to a lower corner of the housing 14. In another example, one or more strain gages 18 may be mounted to a surface 28 of an internal element of the portable electronic device 12, 12', such as a circuit board 30.

Figure 6:
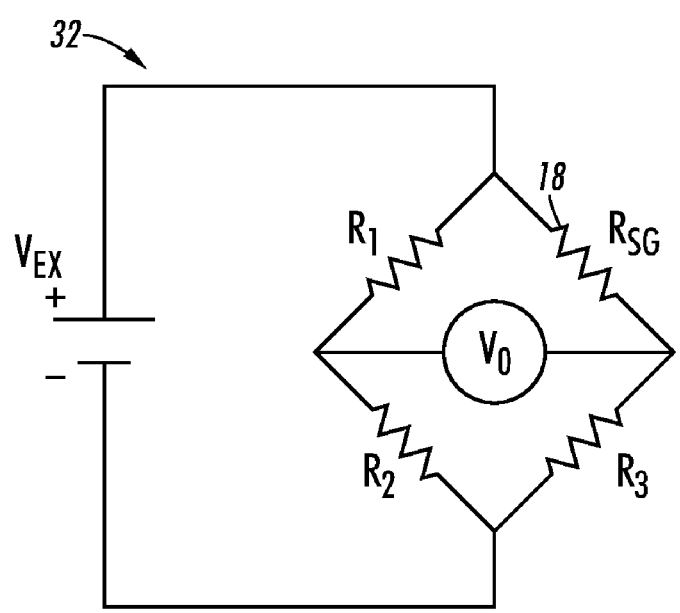
FIG. 6 is a simplified circuit diagram of a wheatstone bridge including the strain gage of FIG. 5.

With reference to FIG. 6, each strain gage is one of the resistors in a wheatstone bridge 32. The bridge receives power VEX from the existing power source 34 of the portable electronic device 12. 12'. The output voltage VO of each bridge 32 is an input to an alarm circuit 36. When R1/R2=RSG/R3, the output voltage VO is zero. Any change in resistance in any arm of the bridge 32 will result in a nonzero output voltage. When mechanical stress is imposed on the strain gage 18, it produces a linear change in its electrical resistance RSG, unbalancing the bridge 32 and producing a nonzero output voltage VO. The alarm circuit 36 may use "exclusive or" logic such that the alert condition is set if any voltage level VO exceeds a predetermined setpoint, the alarm circuit 36 activates the portable electronic device's user interface (e.g. cell phone ring tone, MP3 player alert tone, cell phone vibration mode, camera chimes, etc) to alert the user. A multiplexed input arrangement could be used to facilitate this interface between the bridge circuits 32 and the signal processing logic. The user could then take steps to remove the device 12, 12' from the hazardous environment, saving the cost of replacing it. The alarm circuit 36 resets once the load on the device 12, 12' is relieved and VO is again equal to zero, deactivating the user interface.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A portable electronics distress detection system to detect an external load imposed on a portable electronic device and provide a warning of impending mechanical failure due to the external load, the portable electronic device having a housing with an inner surface, the system comprises:
    at least one strain gage adapted to be mounted to and extend longitudinally on the inner surface of the portable electronic device housing;
    at least one strain gage adapted to be mounted to and extend laterally on the inner surface of the portable electronic device housing; and
    an alarm circuit adapted to control a user interface of the portable electronic device, the alarm circuit including a Wheatstone bridge associated with each strain gage, each strain gage providing a resistance input to an arm of the associated Wheatstone bridge;
    whereby a mechanical stress imposed on the strain gage changes the resistance input to the arm of the associated Wheatstone bridge, producing a nonzero voltage output from the Wheatstone bridge, the alarm circuit activating the portable electronic device user interface if the Wheatstone bridge voltage output exceeds a predetermined set point.

2. The portable electronics distress detection system of claim 1 wherein at least one strain gage is adapted to be mounted to an internal element of the portable electronic device.

3. The portable electronics distress detection system of claim 2 wherein the internal element is a circuit board.

4. The portable electronics distress detection system of claim 1 wherein the alarm circuit includes an "exclusive or" logic.

5. The portable electronics distress detection system of claim 1 wherein the system includes a plurality of strain gages and further comprises a multiplexed input arrangement disposed intermediate the strain gages and the Wheatstone bridge.

6. A portable electronics distress detection system to detect an external load imposed on a portable electronic device and provide a warning of impending mechanical failure due to the external load, the portable electronic device having a housing with an inner surface, the system comprises:
    at least one strain gage adapted to be mounted to the inner surface of the portable electronic device housing extending from an upper corner of the portable electronic device housing to a lower corner of the portable electronic device housing; and
    an alarm circuit adapted to control a user interface of the portable electronic device, the alarm circuit including a Wheatstone bridge associated with each strain gage, each strain gage providing a resistance input to an arm of the associated Wheatstone bridge;
    whereby a mechanical stress imposed on the strain gage changes the resistance input to the arm of the associated Wheatstone bridge, producing a nonzero voltage output from the Wheatstone bridge, the alarm circuit activating the portable electronic device user interface if the Wheatstone bridge voltage output exceeds a predetermined set point.

7. The portable electronics distress detection system of claim 6 wherein at least one strain gage is adapted to be mounted to an internal element of the portable electronic device.

8. The portable electronics distress detection system of claim 7 wherein the internal element is a circuit board.

9. The portable electronics distress detection system of claim 6 wherein the alarm circuit includes an "exclusive or" logic.

10. The portable electronics distress detection system of claim 6 wherein the system includes a plurality of strain gages and further comprises a multiplexed input arrangement disposed intermediate the strain gages and the Wheatstone bridge.

11. A portable electronic device comprising:
    a plurality of elements including
        a housing defining an enclosed interior,
        electronics disposed within the interior of the housing, and
        a user interface in electrical communication with the electronics; and
    a distress detection system to detect an external load imposed on the housing, the distress detection system including
        at least one strain gage mounted to an element of the portable electronic device, and
        an alarm circuit in electrical communication with the user interface, the alarm circuit including a Wheatstone bridge associated with each strain gage, each strain gage providing a resistance input to an arm of the associated Wheatstone bridge;

whereby a mechanical stress imposed on the strain gage through the portable electronic device changes the resistance input to the arm of the associated Wheatstone bridge, producing a nonzero voltage output from the Wheatstone bridge, the alarm circuit activating the user interface if the Wheatstone bridge voltage output exceeds a predetermined set point to provide a warning of impending mechanical failure due to the external load.

12. The portable electronic device of claim 11 wherein at least one strain gage is mounted to an inner surface of the housing.

13. The portable electronic device of claim 12 wherein at least one strain gage extends longitudinally on the inner surface of the housing and at least one strain gage extends laterally on the inner surface of the housing.

14. The portable electronic device of claim 12 wherein at least one strain gage extends on the inner surface of the housing from an upper corner of the housing to a lower corner of the housing.

15. The portable electronic device of claim 11 wherein at least one strain gage is adapted to be mounted to an internal element of the portable electronic device.

16. The portable electronic device of claim 15 wherein the internal element is a circuit board.

17. The portable electronic device of claim 11 wherein the alarm circuit includes an "exclusive or" logic.

18. The portable electronic device of claim 11 wherein the distress detection system includes a plurality of strain gages and the portable electronic device further comprises a multiplexed input arrangement disposed intermediate the strain gages and the Wheatstone bridge.

* * * * *